Patented Jan. 18, 1927.

1,614,525

UNITED STATES PATENT OFFICE.

JOSEPH M. HILBISH, OF PITTSBURGH, PENNSYLVANIA.

METHOD OF TREATING BLAST-FURNACE SLAG.

No Drawing.   Application filed June 8, 1926. Serial No. 114,556.

The object of this invention is to provide a practical and economical method of converting blast furnace slag into a coherent dense hard mass, thereby rendering it suitable for the manufacture of building blocks, slabs, tiles, etc., as well as for use as an aggregate in concrete or other cementitious building or paving materials.

It is well known that blast furnace slag in its natural form is quite porous, that it lacks coherence and readily disintegrates. These characteristics are due to its content of uncombined bases, chief of which is calcium oxide. Because of the high cost and practical difficulties involved in the procedures heretofore suggested for the treatment of blast furnace slag, it has been imsponsible to convert into a valuable marketable material the large volume of it which is produced in excess of that consumed principally in the manufacture of hydraulic cement.

According to this invention blast furnace slag is converted into a coherent dense hard mass capable of the various uses already suggested, as well as of other uses, by adding to it while in a molten condition sufficient alumina to combine with the uncombined bases of the slag, the alumina when so added being mixed with a fluxing agent capable of reducing the fusion point of the alumina materially below the temperature of the molten slag so that the alumina may then readily combine with the uncombined bases of the slag.

While the invention contemplates the use of alumina artificially mixed with a suitable fluxing agent or agents, the method is preferably practiced by the addition to molten blast furnace slag of an amount of what is known as red mud, which is a by-product of the electrolytic process of recovering alumina from bauxite or other aluminous clays or raw materials. Red mud contains from about 20 to 40% of alumina mixed with a number of other metal oxides which I have found afford a flux which reduces the fusion point of alumina materially below that of molten blast furnace slag, so that when it is added to molten slag the heat of the slag is quite sufficient to fuse the alumina. Not only is red mud technically highly suitably for use in the method herein provided, but its use has the additional advantage of conserving a product which is produced in relatively large quantities, and which has so far been found to be practically useless for any purpose. Therefore in the practice of this invention two practically useless by-products of metal industries are utilized in the economic production of a material, the utility of which is practically unlimited in many arts.

The amount of red mud necessary to be added to molten blast furnace slag to convert it into a coherent dense hard mass depends first upon the analysis of the particular slag used, and secondly upon the analysis of the red mud. The analysis of both of these materials vary considerably both with respect to their constituents and to the relative percentages of them. However, I have found that an excess of red mud may be added to molten blast furnace slag to produce the product which has been described, and accordingly it is unecessary to make exact analyses of either the slag or red mud. Ordinarily from one to four pounds of red mud should be added to each sixty pounds of slag.

By way of example and not of limitation, there is given in the following table an analysis of a particular blast furnace slag, a particular red mud, and the hard dense product produced by adding the red mud to the slag in the proportion of approximately one pound of the red mud to 28.4 pounds of the slag.

| Constituents. | Slag. | Red mud. | Product. |
|---|---|---|---|
| | Per cent | Per cent | Per cent |
| SiO₂ | 37.90 | 18.50 | 37.24 |
| Al₂O₃ | 13.60 | 31.80 | 14.14 |
| Fe₂O₃ | .80 | 8.30 | 1.05 |
| CaO | 43.40 | 10.00 | 42.22 |
| MgO | 2.70 | .43 | 2.62 |
| TiO₂ | .18 | 7.40 | .42 |
| Na₂O | 1.08 | 8.03 | 1.31 |
| CO₂ | | 7.80 | |
| H₂O (above 100° C.) | | 7.80 | |

The red mud may be added to the slag in a ladle, or in a trough, or as the slag flows to a ladle or other receptacle. The slag should be at a temperature of not less than about 2400° F. to cause the alumina of the red mud to combine with the free calcium of the slag to form calcium aluminate. If the resulting product is used for the manufacture of building slabs, blocks, tiles, etc., it may before solidification be poured into suitable molds. If it is to be used for an aggregate it may be permitted to solidify in a ladle, pit, cooling bed or the like, and after solidification be crushed and screened to desired sizes.

According to the provisions of the patent statutes, I have described the principle and operation of my invention, and have given a specific example of the manner in which it may be practiced. However, I desire to have it understood that, within the scope of the appended claims, the invention may be practiced otherwise than as specifically described.

I claim as my invention:

1. The method of converting blast furnace slag into a coherent dense hard mass, comprising adding sufficient red mud to molten blast furnace slag to combine with the uncombined bases of the slag, and permitting the resulting product to solidify.

2. The method of converting blast furnace slag with a coherent dense hard mass, comprising adding red mud to blast furnace slag at a temperature of not less than about 2400° F., whereby the alumina of the red mud fuses and combines with the free calcium of the slag to form calcium aluminate.

In testimony whereof, I sign my name.

JOSEPH M. HILBISH.